US010482162B2

(12) United States Patent
Cai et al.

(10) Patent No.: US 10,482,162 B2
(45) Date of Patent: Nov. 19, 2019

(54) AUTOMATIC EQUATION TRANSFORMATION FROM TEXT

(71) Applicant: INTERNATIONAL BUSINESS MACHINES CORPORATION, Armonk, NY (US)

(72) Inventors: Keke Cai, Beijing (CN); HongLei Guo, Beijing (CN); Zhong Su, Beijing (CN); Li Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,342

(22) Filed: Nov. 30, 2017

(65) Prior Publication Data

US 2019/0163726 A1 May 30, 2019

(51) Int. Cl.
*G06F 17/00* (2019.01)
*G06F 17/21* (2006.01)
(Continued)

(52) U.S. Cl.
CPC ........ *G06F 17/215* (2013.01); *G06F 17/2264* (2013.01); *G06K 9/00463* (2013.01);
(Continued)

(58) Field of Classification Search
CPC .. G06F 17/2785; G06F 19/707; G06F 17/215; G06F 17/2264; G06F 16/5846; G06K 9/00463; G06K 2209/01
See application file for complete search history.

(56) References Cited

U.S. PATENT DOCUMENTS 5,446,652 A * 8/1995 Peterson ............. G06F 11/2257
  703/6
6,795,838 B1 * 9/2004 Kataoka ................ G06F 17/215
  382/187
(Continued)

FOREIGN PATENT DOCUMENTS

CN        105243049 A    1/2016

OTHER PUBLICATIONS

Kacem et al., "Automatic Extraction of Printed Mathematical Formulas Using Fuzzy Logic and Propagation of Context," International Journal on Document Analysis and Recognition (IJDAR), Dec. 2001, p. 97-108, vol. 4, Issue 2, Springer-Verlag.
(Continued)

*Primary Examiner* — Laurie A Ries
(74) *Attorney, Agent, or Firm* — Alexis N. Hatzis

(57) ABSTRACT

A method, computer system, and a computer program product for automatic equation transformation from text is provided. The present invention may include receiving a text document. The present invention may then include identifying a mathematical formula expressed in the received text document. The present invention may then include removing a plurality of superfluous language from the received text document based on the identified mathematical formula. The present invention may also include transforming the identified mathematical formula into a symbolic representation based on a trained model. The present invention may finally include outputting the symbolic representation.

17 Claims, 8 Drawing Sheets

(51) Int. Cl.
*G06K 9/00* (2006.01)
*G06F 17/22* (2006.01)
*G06K 9/68* (2006.01)
*G06F 16/583* (2019.01)

(52) U.S. Cl.
CPC ........ *G06K 9/6814* (2013.01); *G06F 16/5846* (2019.01); *G06K 2209/01* (2013.01)

(56) References Cited

U.S. PATENT DOCUMENTS

| | | | | |
|---|---|---|---|---|
| 7,403,890 | B2* | 7/2008 | Roushar | G06F 17/277 704/10 |
| 8,249,344 | B2* | 8/2012 | Viola | G06F 17/271 382/173 |
| 8,810,833 | B2* | 8/2014 | Suzuki | G03G 21/1633 347/138 |
| 8,818,033 | B1 | 8/2014 | Liu et al. | |
| 9,201,927 | B1* | 12/2015 | Zhang | G06F 17/271 |
| 9,830,315 | B1* | 11/2017 | Xiao | G06F 17/2785 |
| 9,953,171 | B2* | 4/2018 | Saxena | G06F 21/602 |
| 2004/0090439 | A1* | 5/2004 | Dillner | G06K 9/00402 345/440 |
| 2004/0194009 | A1* | 9/2004 | LaComb | G06F 17/211 715/239 |
| 2007/0033524 | A1* | 2/2007 | Michelstein | G06F 17/215 715/236 |
| 2011/0270604 | A1* | 11/2011 | Qi | G06F 17/271 704/9 |
| 2012/0102383 | A1* | 4/2012 | Liu | G06F 17/215 715/202 |
| 2013/0205200 | A1* | 8/2013 | Lazarevic | G06K 9/00463 715/244 |
| 2013/0268263 | A1* | 10/2013 | Park | G06F 17/215 704/9 |
| 2014/0075410 | A1* | 3/2014 | Wolfram | G06F 8/30 717/106 |
| 2017/0315984 | A1* | 11/2017 | Goyal | G06F 17/277 |
| 2017/0337423 | A1* | 11/2017 | Chen | G06N 3/02 |
| 2018/0121787 | A1* | 5/2018 | Hashimoto | G06F 17/2715 |
| 2018/0150956 | A1* | 5/2018 | Kao | G06T 7/11 |
| 2018/0157386 | A1* | 6/2018 | Su | G06K 9/00 |
| 2018/0260472 | A1* | 9/2018 | Kelsey | G06F 17/271 |
| 2018/0357240 | A1* | 12/2018 | Miller | G06F 16/3329 |
| 2019/0073351 | A1* | 3/2019 | Zhang | G06F 17/2705 |

OTHER PUBLICATIONS

Lin et al., "Mathematical Formula Identification in PDF Documents," International Conference on Document Analysis and Recognition, 2011, p. 1419-1423, IEEE Computer Society.

Mell et al., "The NIST Definition of Cloud Computing," National Institute of Standards and Technology, Sep. 2011, p. 1-3, Special Publication 800-145.

* cited by examiner

+ addition
− subtraction
× multiplication
÷ division
= equal to
≠ not equal to
< less than
> greater than
≤ less than or equal to
≥ greater than or equal to

AUTOMATIC EQUATION TRANSFORMATION FROM TEXT

BACKGROUND

The present invention relates generally to the field of computing, and more particularly to equation transformation.

Regulatory compliance analytics may enable services institutions in regulated industries to effectively determine the controls required for regulatory compliance, and to assess existing internal control coverage, given regulatory requirements. However, in the banking industry, for example, the cost of regulatory compliance is vast. More than $600 billion may be spent annually to address compliance requirements, more than 27,000 employees may be needed to work on compliance tasks at one bank alone, and more than 70% of a bank's budget that is not spent on running the bank may be spent on compliance issues, thereby limiting the capital available for innovation and growth. Further, there may be more than 20,000 regulations to comply with.

SUMMARY

Embodiments of the present invention disclose a method, computer system, and a computer program product for automatic equation transformation from text. The present invention may include receiving a text document. The present invention may then include identifying a mathematical formula expressed in the received text document. The present invention may then include removing a plurality of superfluous language from the received text document based on the identified mathematical formula. The present invention may also include transforming the identified mathematical formula into a symbolic representation based on a trained model. The present invention may finally include outputting the symbolic representation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 illustrates an excerpt from an automatic equation transformation database according to at least one embodiment;

DETAILED DESCRIPTION

Figure 1:
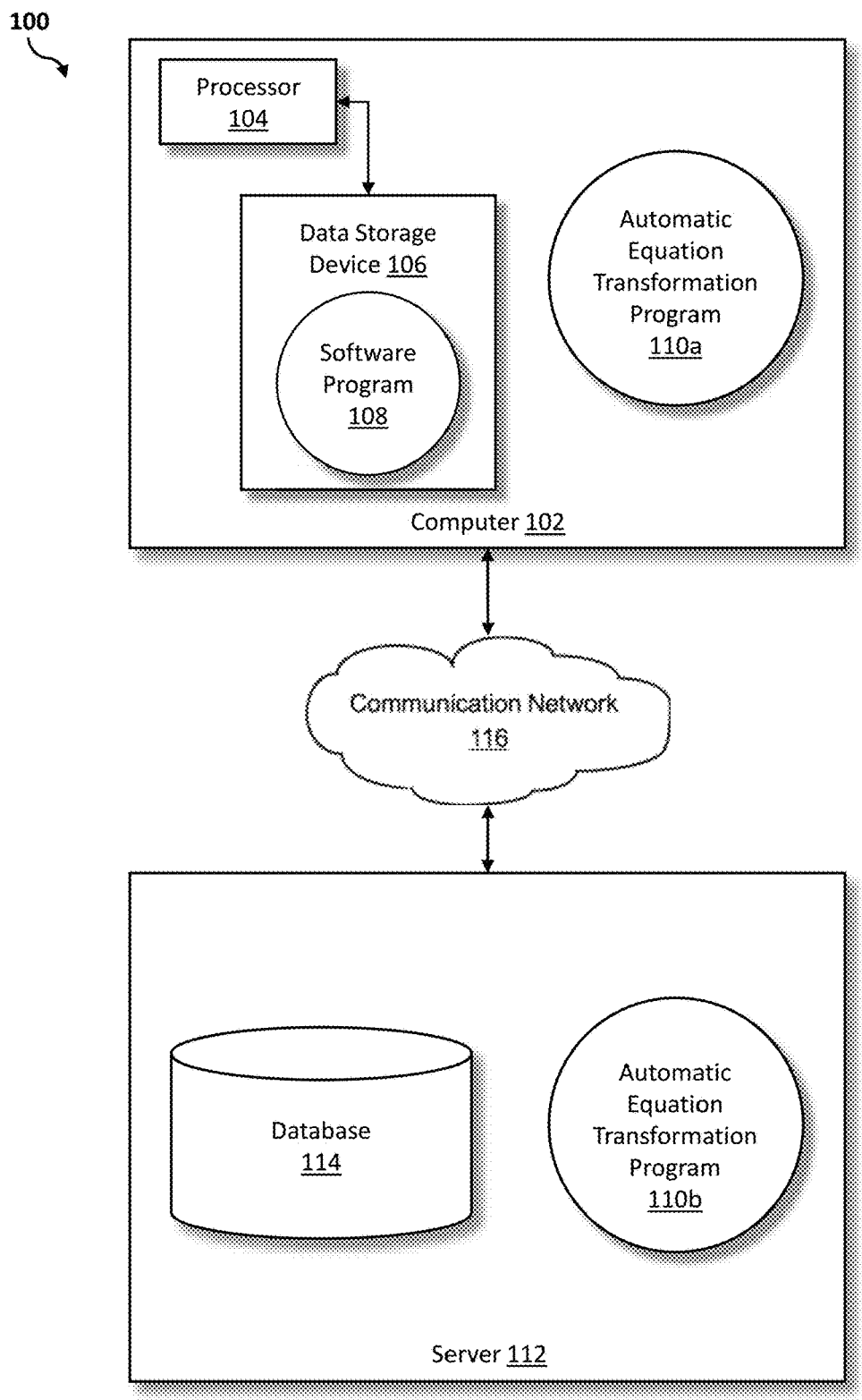
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automatic equation transformation from text for compliance checking. As such, the present embodiment has the capacity to improve the technical field of equation transformation by automatically transforming mathematical equations represented by text to a corresponding mathematical expression. More specifically, a document may be received, the automatic equation transformation program may identify the mathematical formula expressed by the document's text, the program may remove any unneeded language, the program may transform the identified text into mathematical symbols based on a trained model, and the program may output a mathematical equation represented by numerals.

As described previously, regulatory compliance analytics may enable services institutions in regulated industries to effectively determine the controls required for regulatory compliance, and to assess existing internal control coverage against regulatory requirements. However, in the banking industry, for example, the cost of regulatory compliance is vast. More than $600 billion may be spent annually to address compliance requirements, more than 27,000 employees may be needed to work on compliance tasks at one bank alone, and more than 70% of a bank's budget that is not spent on running the bank may be spent on compliance issues, thereby limiting the capital available for innovation and growth. Further, there may be more than 20,000 regulations to comply with. Mathematical equation recognition may be the basis of equation compliance checking, however, traditional methods of equation checking may focus on formula expression, and may overlook equations identified by text.

Therefore, it may be advantageous to, among other things, automatically transform equations represented by text into mathematical symbols for compliance checking.

According to at least one embodiment, regulatory compliance personnel may need to remain up to date on regulation and practices in a given industry. In the financial domain, for example, such as in the banking or securities industries, compliance checking may involve analysis of equations represented by numbers or text. Many times, mathematical equation recognition may be a means by which to perform equation compliance checking. However, focusing on the formula expression may result in overlooking an equation identified by text.

Therefore, according to at least one embodiment, a document containing industry regulations may be inputted into the automatic equation transformation program, which may automatically transform mathematical equations represented by text into a corresponding mathematical expression.

According to at least one embodiment, the portion of text containing equation information may be converted into a numerical representation of such equation.

According to at least one embodiment, the automatic equation transformation program may include three components. The first component may identify the snippet or portion of text containing the mathematical expression. The second component may analyze the identified portion of text, including removing irrelevant information from the portion of text (e.g., data cleaning), identifying the variable or variables and operator or operators involved in the equation (e.g., mathematical entity recognition), and identifying the operational relationship between the variables (e.g., variable relationship recognition). The third component of the automatic equation transformation program may transform the text into a mathematical formula expression using numerals and symbols.

According to art least one embodiment, operator symbols may be predefined in the automatic equation transformation program. The automatic equation transformation program may utilize the predefined operator symbols to search the inputted document as part of the first component of the automatic equation transformation program.

According to at least one embodiment, the second component of the automatic equation transformation program, which may focus on equation analysis and transformation, may include mining pertinent information from the inputted text. Operator and variable entity recognition may be accomplished using machine learning methods. Operator dependency relationships between mathematical entities may be determined using an equation dependency parser.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an automatic equation transformation program 110a. The networked computer environment 100 may also include a server 112 that is enabled to run an automatic equation transformation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the automatic equation transformation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the automatic equation transformation program 110a, 110b (respectively) to transform mathematical equations written in text into their numerical and symbolic equivalent. The automatic equation transformation method is explained in more detail below with respect to FIGS. 2 through 5.

Figure 2:
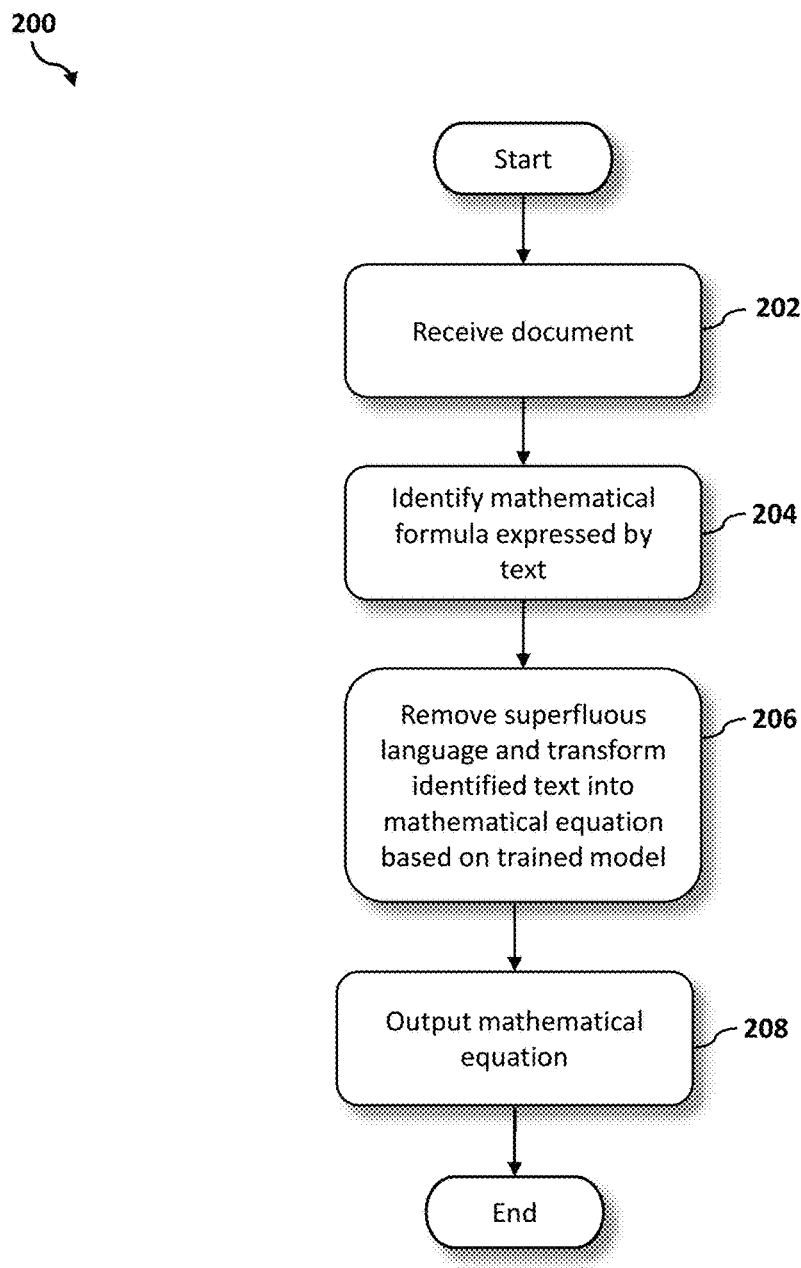
FIG. 2 is an operational flowchart illustrating a process for automatic equation transformation according to at least one embodiment.

Referring now to FIG. 2, an operational flowchart illustrating the exemplary automatic equation transformation process 200 used by the automatic equation transformation program 110a and 110b according to at least one embodiment is depicted.

At 202, a document is received by the automatic equation transformation program 110a, 110b. A document may include pages of text or may be a snippet or portion of text inputted by the automatic equation transformation program's 110a, 110b user. The document may be searched for by the user on the user's local computer (e.g., client computer 102) or by logging into a remote cloud service and may be uploaded by the user into the interface of the automatic equation transformation program 110a, 110b. For example, a standard text document may be inputted by the user with the length of the document being at the user's discretion, not predefined or limited by the automatic equation transformation program 110a, 110b. According to the present embodiment, the automatic equation transformation program 110a, 110b may be local on the user's desktop or remote within the cloud. A cloud service may permit password protected remote access by a user from various remote locations.

Next, at 204, the mathematical formula expressed by the text is identified by the automatic equation transformation program 110a, 110b. The formula may be identified by focusing in on known keywords in the text and using the known keywords to recognize that the inputted text corresponds to a mathematical equation. Operator entities, variable entities, and a dependency relationship between both operator and variable entities may be mined. For example, the automatic equation transformation program 110a, 110b may parse through an inputted sentence one word at a time and may compare the words in the sentence to a database 114 of known mathematical operator symbols, discussed in more detail below with respect to FIG. 3. To parse through an inputted sentence, the automatic equation transformation program 110a, 110b may utilize an indexing technique to permit the search to be done in less time. An indexing technique may involve the automatic equation transformation program 110a, 110b having an index of each word that appears within the document, searching within the index for a known operator symbol (for example, an operator symbol contained within database 114), and returning the sentence or sentences in the document that contain the searched-for symbol.

Next, at 206, superfluous language is removed from the inputted document and the identified text is transformed into a mathematical equation based on a trained model. A syntactic analysis of a given text input may be done. The main component of the given input may be identified and extracted, and likewise any unneeded and superfluous textual content may be removed from the given input. The automatic equation transformation program 110a, 110b may identify mathematical variables and may determine if any textual content exists that may be removed by utilizing natural language processing techniques to generate a tree-like structure. Any existing relationship between the words of the given input may be illustrated in a connected tree-like graph. The main sentence components may form the leaves of the tree, and any textual information not forming a part of the tree may be removed as unneeded to transform the given text into a mathematical equation. Any textual information not forming a part of the tree may not be a component of the equation. An example of a tree-like structure will be discussed in more detail below with respect to FIG. 4.

The process for forming the tree-like structure may be referred to as equation dependency parsing, where the structure of a sentence may be analyzed to establish a relationship between words within the sentence. An equation dependency parser may parse through a sentence by performing a scan of the sentence and maintaining a stack of inputted words and a stack of processed words. The equation dependency parser may maintain in the input stack the text elements needing to be processed, and may maintain in the processed stack the previously processed text elements. At each step, an element may transition from the input stack into the processed stack. Any transition noted between the elements in the processed stack may be recorded. A parse may be complete when the input stack is empty. An example equation dependency parser will be discussed in more detail below with respect to FIG. 5.

A standard neural network with one or more hidden layers may be implemented with the equation dependency parser. Transforming the identified text into mathematical symbols may encompass maintaining two stacks of words, where the left stack contains all elements of the sentence and the right stack contains a root. In each phase, an element may be moved from the left stack into the right stack and any transition existing between the moved element and the existing elements in the stack may be identified. This process may be repeated until there are no elements remaining in the left stack.

An input layer may be represented by the following four variables:

$$V_{ner} \in \mathbb{R}^d \ V_{DEPner} \in \mathbb{R}^d \ V_{context} \in \mathbb{R}^d \ V_{arc} \in \mathbb{R}^d$$

The first variable may refer to an entity's semantic embedding and may be represented as a d-dimensional vector. The second variable may be a related NER identified based on a syntax relationship, and may also be represented as a d-dimensional vector. The third variable may be the surrounding word of the entity in an equation expression, represented by a d-dimensional vector. The fourth variable may be a label embedding vector.

A hidden layer may be represented by the following variables, and the corresponding equation:

$$W(H,V_{ner})W(H,V_{DEPner})W(H,V_{context})W(H,V_{arc})h = \sigma$$
$$(w_1 * V_{ner} + w_2 * V_{DEPner} + w_3 * V_{context} + w_4 * V_{arc})$$

Lastly, the output layer may be represented by the following equation:

$$p = \text{softmax}(W^\circ H)$$

The neural network may be trained first, and once the model is constructed, the model may be applied to the inputted text to obtain an equation dependency tree, as previously discussed. The training process may entail inputting a training set S, running the neural network on the training set S, calculating an amount of error, running a back propagation method to calculate the error contribution of each portion of data in the inputted training set S, updating the parameters, and outputting a training model.

Thereafter, given a portion of text inputted into the automatic equation transformation program 110a, 110b, a stack may be constructed, and at each processing step encountered by the equation dependency parser, identified entities may be added to the processed stack. The top N entities in the processed stack, the depended entities of each top N entity and a corresponding arc label, and the non-entity words surrounding the top N entities may be received as input into the neural network. The embedding of the elements of the operator entity, variable entity, arc label, and context word may also be received as input. Each operator entity and variable entity may be represented as the following d-dimensional vector:

$$e_i \in \mathbb{R}^d$$

Each arc label may be represented by the following t-dimensional vector, and each word in the context may be represented by the following k-dimensional vector:

$$arc_i \in \mathbb{R}^t \ w_i \in \mathbb{R}^k$$

The dependency arc and label may be outputted by the neural network. If a dependency exists, the detected dependency relationship and label may be outputted and the depended element may be removed from the processed stack.

Lastly, at 208, the mathematical equation is outputted to the user. The output may be based on the identified mathematical equations detected by the equation dependency parser and recognition process. The output may be a list of equations contained within a standard text document, which may be downloadable by the user in the automatic equation transformation program 110a, 110b interface.

Referring now to FIG. 3, an excerpt 300 from an automatic equation transformation database is depicted. A database 114 of known mathematical operator symbols may mimic dictionary format in that the database 114 may define a symbolic representation of a mathematical operator by the mathematical operator's textual equivalent. For example, the list of known symbols may include those pertaining to mathematical functions such as addition, subtraction, multiplication, and division, and may also include symbols pertaining to mathematical comparisons such as equal to, less than, and greater than.

Figure 4:
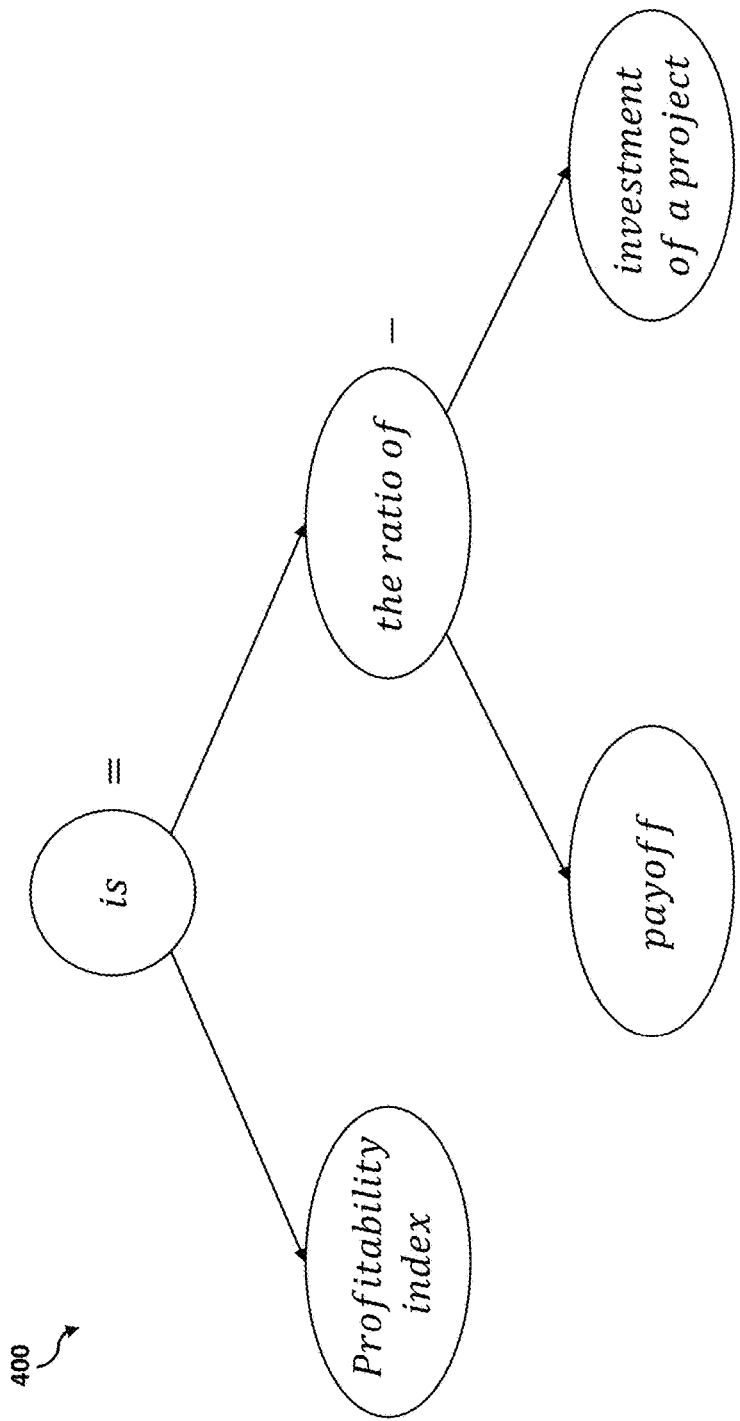
FIG. 4 illustrates a tree-like structure generated by syntactic analysis according to at least one embodiment.

Referring now to FIG. 4, a tree-like structure 400 generated during a syntactic analysis is depicted. Given an inputted regulation document, the automatic equation transformation program 110a, 110b may scan the document, may identify the portion which contains an equation, and may transfer the equation written in text to a numerical and symbolic representation of the inputted text. In other words, the automatic equation transformation program 110a, 110b may first identify where the formula is in the inputted document, the automatic equation transformation program 110a, 110b may next determine what the formula is, and the automatic equation transformation program 110a, 110b may lastly determine how to express the inputted formula using numbers and symbols. In order to determine what the formula is, the automatic equation transformation program 110a, 110b may use an equation dependency parser, discussed in more detail below with respect to FIG. 5. A result of parsing the equation may include the determined sentence roots depicted in a tree-like structure.

For example, the following sentence may be inputted into the automatic equation transformation program 110a, 110b:

Profitability index (PI), known as profit investment ratio (PIR) and value investment ratio (VIR), is the ratio of payoff to investment of a proposed project.

As previously mentioned, the automatic equation transformation program 110a, 110b may first locate the mathematical text within the inputted sentence. Continuing with the above example, the operator "the ratio of" may be identified as mathematical text. Next, a syntactic analysis may be done and the main sentence components may be determined. Variable entity recognition may locate "profitability index," "payoff," and "investment of a project," while operator entity recognition may locate "the ratio of." The extracted sentence components may be placed into a tree structure, with the resulting tree 400 containing all components of the following equation:

$$\text{Profitability index} = \frac{\text{payoff}}{\text{investment of project}}$$

Figure 5:
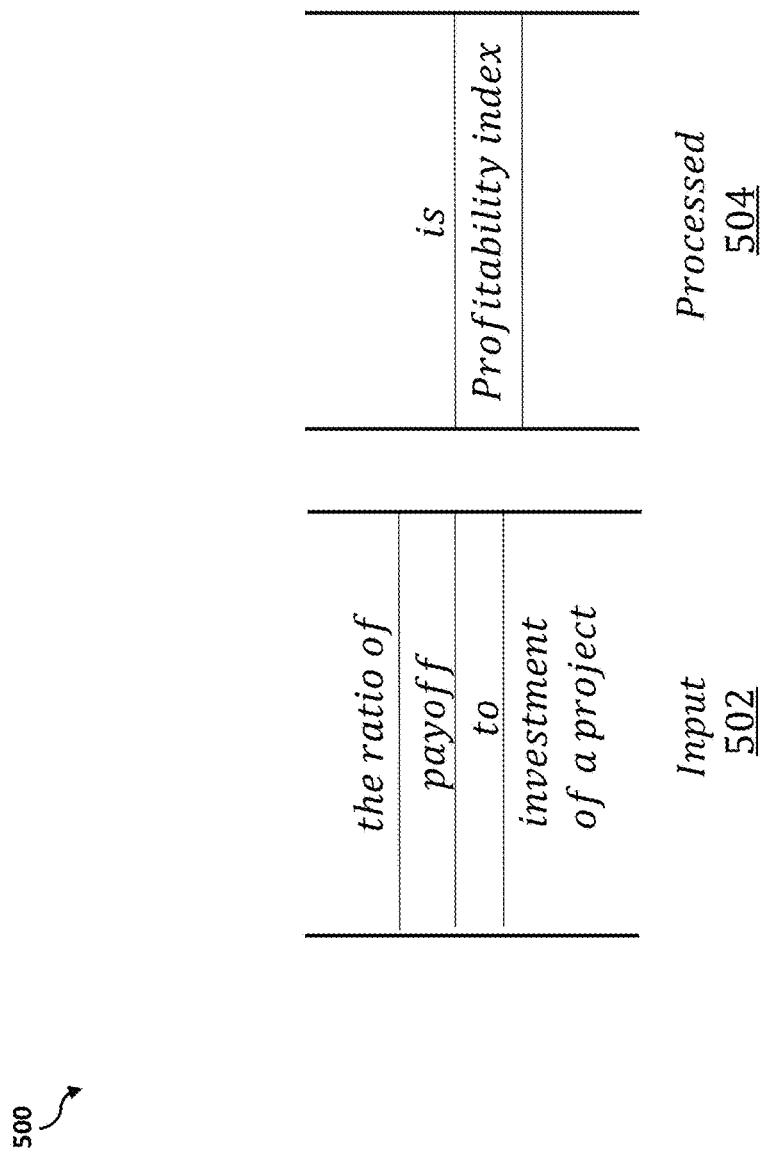
FIG. 5 illustrates an equation dependency parser according to at least one embodiment.

Referring now to FIG. 5, an equation dependency parser is depicted. The equation dependency parser 500 may contain two stacks. The leftmost "input" stack 502 may maintain a list of textual components from an identified mathematical sentence and the rightmost "processed" stack 504 may contain processed elements. At each step, an element may be taken from the input stack 502 and placed in the processed stack 504. If a transition exists between an element in the input stack 502 and those in the processed stack 504, the transition may be recorded. A parse may be complete when the input stack 502 is empty.

It may be appreciated that FIGS. 2 through 5 provide only an illustration of one embodiment and do not imply any limitations with regard to how different embodiments may be implemented. Many modifications to the depicted embodiment(s) may be made based on design and implementation requirements.

Figure 6:
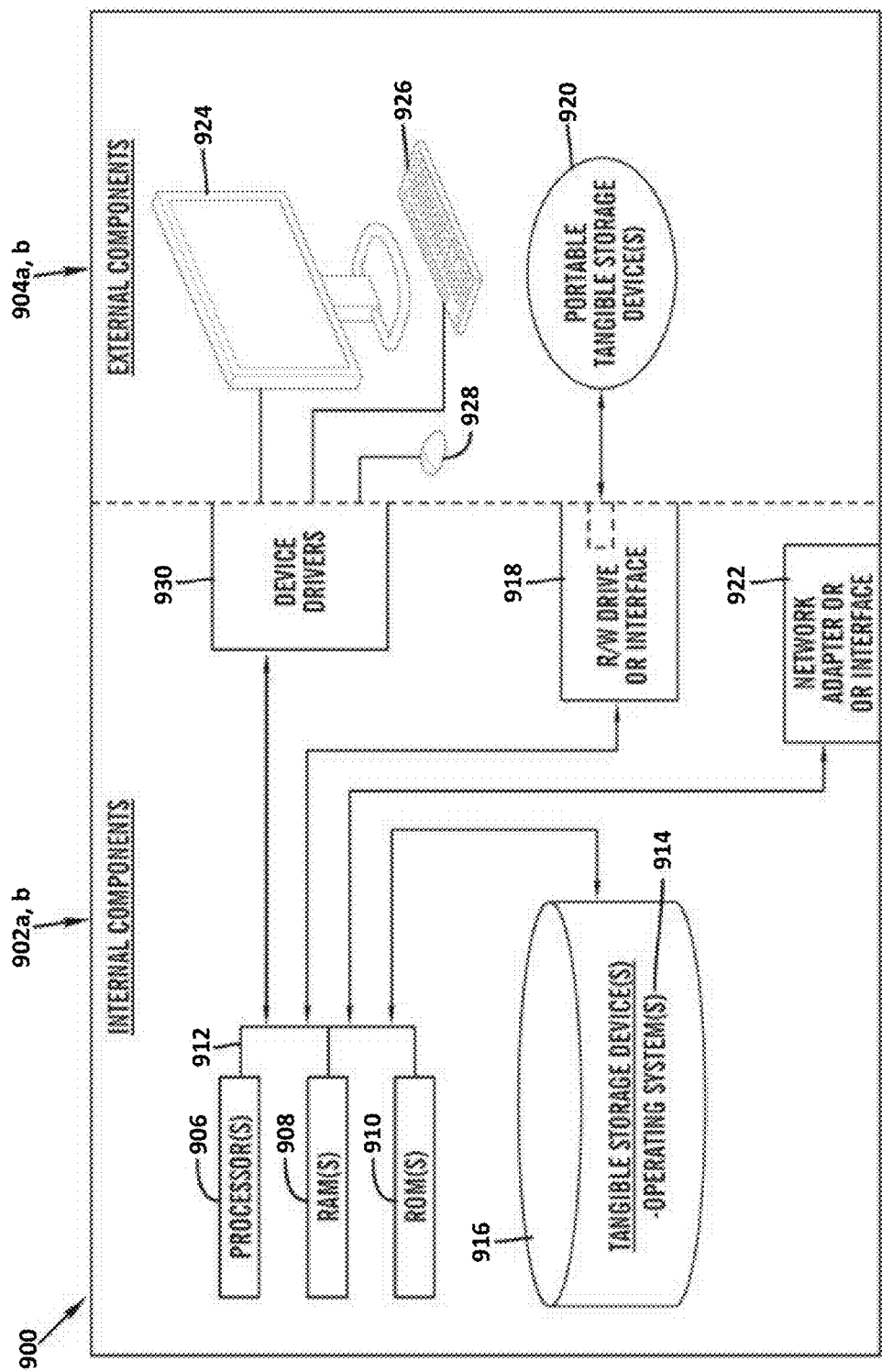
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the automatic equation transformation program 110a in client computer 102, and the automatic equation transformation program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the automatic equation transformation program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the automatic equation transformation program 110a in client computer 102 and the automatic equation transformation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the automatic equation transformation program 110a in client computer 102 and the automatic equation transformation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
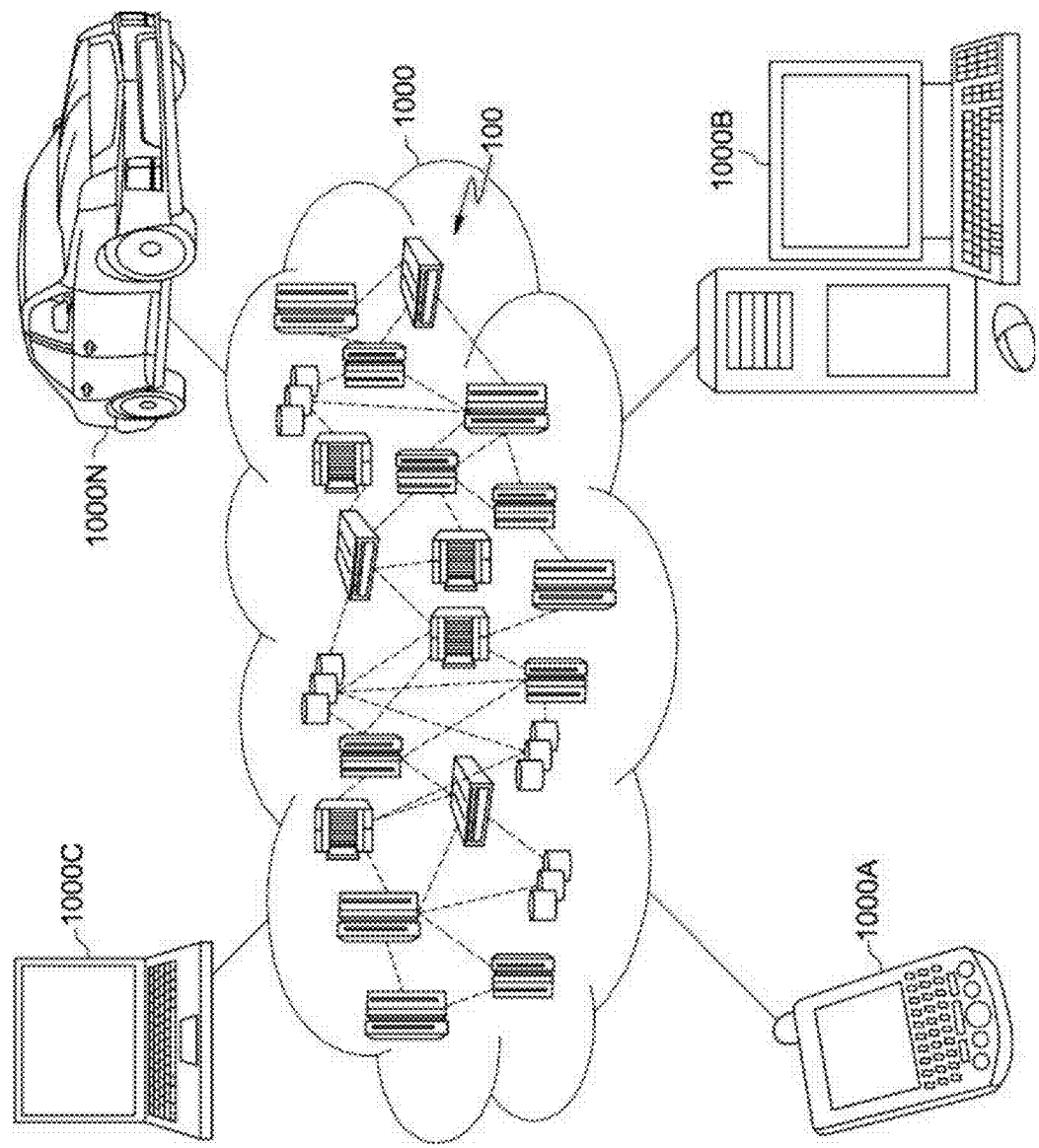
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
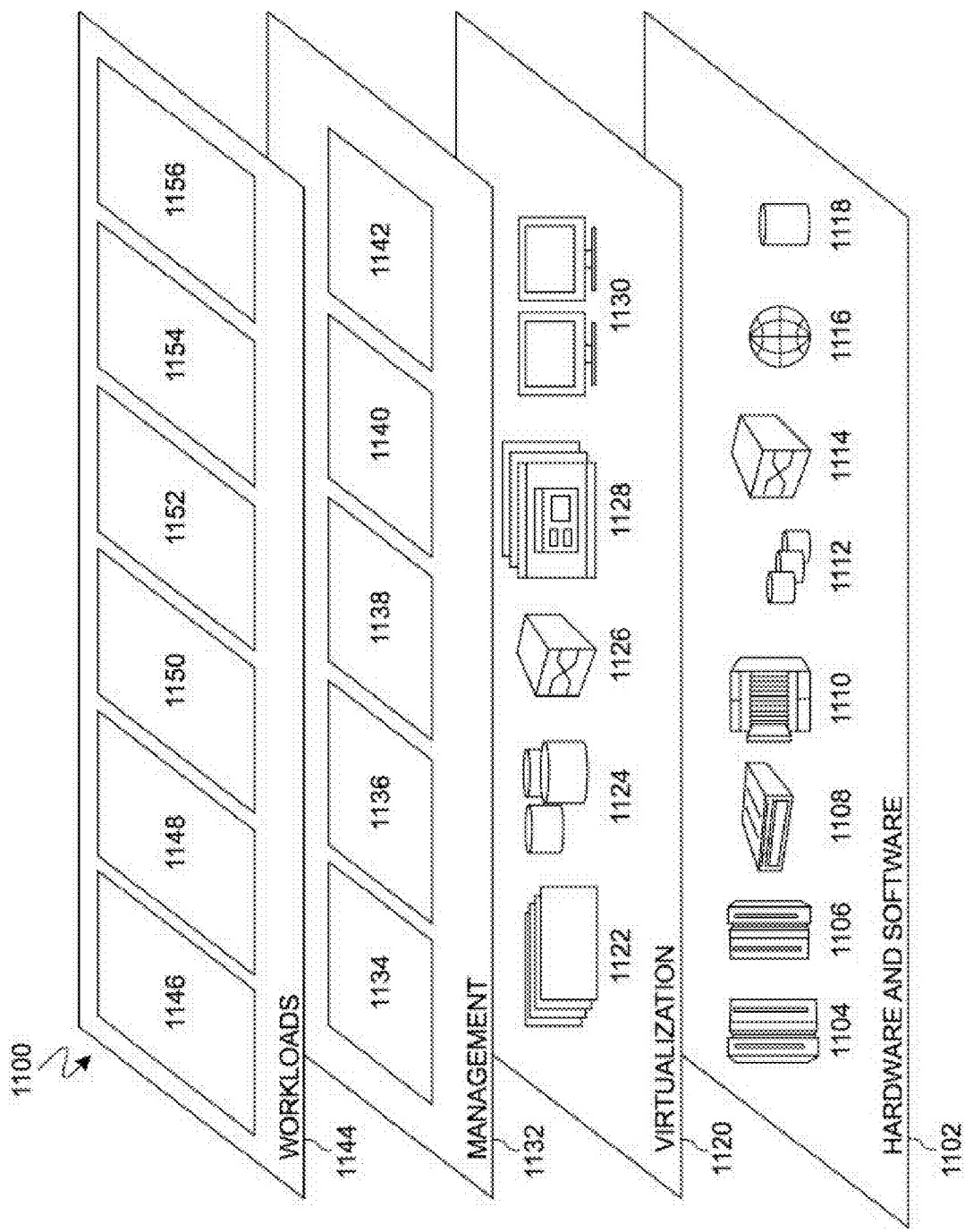
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and automatic equation transformation 1156. An automatic equation transformation program 110*a*, 110*b* provides a way to transform mathematical equations written in text into their numeric and symbolic equivalent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatic equation transformation from text, the method comprising:
   receiving a text document;
   identifying a mathematical formula expressed in the received text document;
   removing a plurality of superfluous language from the received text document based on the identified mathematical formula;
   transforming the identified mathematical formula into a symbolic representation based on a trained model;
   utilizing a natural language processing technique to generate a tree-like structure using an identified plurality of mathematical equation language,
      wherein the tree-like structure is generated using an equation dependency parser, an input stack, a processed stack,
      wherein a neural network with one or more hidden layers is implemented with the equation dependency parser,
      wherein an input layer of the neural network is represented by a semantic embedding variable, a named-entity recognition variable, a surrounding word variable, and a label embedding vector; and
      wherein an output layer of the neural network is represented using a softmax function; and
   outputting the symbolic representation.

2. The method of claim 1, wherein the received text document is a variable length determined by a user.

3. The method of claim 1, wherein identifying the mathematical formula expressed in the received text document further comprises:
   identifying a plurality of keywords by parsing through a plurality of text associated with the received text document; and
   comparing the identified plurality of keywords to a database of known mathematical symbols.

4. The method of claim 3, wherein identifying the plurality of keywords by parsing through the plurality of text associated with the received text document comprises utilizing an indexing technique to search the received text document.

5. The method of claim 1, wherein removing the plurality of superfluous language from the received text document further comprises:
   performing a syntactic analysis of the received text document; and
   removing a plurality of language from the received text document that is not part of the generated tree-like structure.

6. The method of claim 1, wherein the output mathematical equation is a downloadable text document.

7. A computer system for automatic equation transformation from text, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a text document;
   identifying a mathematical formula expressed in the received text document;
   removing a plurality of superfluous language from the received text document based on the identified mathematical formula;
   transforming the identified mathematical formula into a symbolic representation based on a trained model;
   utilizing a natural language processing technique to generate a tree-like structure using an identified plurality of mathematical equation language,
      wherein the tree-like structure is generated using an equation dependency parser, an input stack, a processed stack,
      wherein a neural network with one or more hidden layers is implemented with the equation dependency parser,
      wherein an input layer of the neural network is represented by a semantic embedding variable, a named-entity recognition variable, a surrounding word variable, and a label embedding vector; and wherein an output layer of the neural network is represented using a softmax function; and outputting the symbolic representation.

8. The computer system of claim 7, wherein the received text document is a variable length determined by a user.

9. The computer system of claim 7, wherein identifying the mathematical formula expressed in the received text document further comprises:

identifying a plurality of keywords by parsing through a plurality of text associated with the received text document; and comparing the identified plurality of keywords to a database of known mathematical symbols.

10. The computer system of claim 9, wherein identifying the plurality of keywords by parsing through the plurality of text associated with the received text document comprises utilizing an indexing technique to search the received text document.

11. The computer system of claim 7, wherein removing the plurality of superfluous language from the received text document further comprises:

performing a syntactic analysis of the received text document; and removing a plurality of language from the received text document that is not part of the generated tree-like structure.

12. The computer system of claim 7, wherein the output mathematical equation is a downloadable text document.

13. A computer program product for automatic equation transformation from text, comprising:

one or more computer-readable storage media and program instructions stored on at least one of the one or more tangible storage media, the program instructions executable by a processor to cause the processor to perform a method comprising:

receiving a text document;

identifying a mathematical formula expressed in the received text document;

removing a plurality of superfluous language from the received text document based on the identified mathematical formula;

transforming the identified mathematical formula into a symbolic representation based on a trained model;

utilizing a natural language processing technique to generate a tree-like structure using an identified plurality of mathematical equation language, wherein the tree-like structure is generated using an equation dependency parser, an input stack, a processed stack, wherein a neural network with one or more hidden layers is implemented with the equation dependency parser, wherein an input layer of the neural network is represented by a semantic embedding variable, a named-entity recognition variable, a surrounding word variable, and a label embedding vector; and wherein an output layer of the neural network is represented using a softmax function; and outputting the symbolic representation.

14. The computer program product of claim 13, wherein the received text document is a variable length determined by a user.

15. The computer program product of claim 13, wherein identifying the mathematical formula expressed in the received text document further comprises:

identifying a plurality of keywords by parsing through a plurality of text associated with the received text document; and comparing the identified plurality of keywords to a database of known mathematical symbols.

16. The computer program product of claim 15, wherein identifying the plurality of keywords by parsing through the plurality of text associated with the received text document comprises utilizing an indexing technique to search the received text document.

17. The computer program product of claim 13, wherein removing the plurality of superfluous language from the received text document further comprises:

performing a syntactic analysis of the received text document; and removing a plurality of language from the received text document that is not part of the generated tree-like structure.

* * * * *